(12) United States Patent
Rovner et al.

(10) Patent No.: US 7,142,509 B1
(45) Date of Patent: Nov. 28, 2006

(54) METHOD AND APPARATUS PROVIDING FOR DELIVERY OF STREAMING MEDIA

(75) Inventors: Edward Joel Rovner, Chapel Hill, NC (US); Lance Richardson, Chapel Hill, NC (US); Cedell A. Alexander, Durham, NC (US)

(73) Assignee: Extreme Networks, Santa Clara, CA (US)

( * ) Notice: Subject to any disclaimer, the term of this patent is extended or adjusted under 35 U.S.C. 154(b) by 823 days.

(21) Appl. No.: 09/951,169

(22) Filed: Sep. 12, 2001

(51) Int. Cl.
*H04L 1/00* (2006.01)

(52) U.S. Cl. .................. 370/230; 370/235; 370/390; 370/428; 370/473

(58) Field of Classification Search ............. 370/230, 370/235, 351, 412, 465, 468, 473; 709/229, 709/238
See application file for complete search history.

(56) References Cited

U.S. PATENT DOCUMENTS

| | | | |
|---|---|---|---|
| 5,892,924 A * | 4/1999 | Lyon et al. ................ | 709/245 |
| 6,034,957 A * | 3/2000 | Haddock et al. ........... | 370/392 |
| 6,157,955 A * | 12/2000 | Narad et al. ............... | 709/228 |
| 6,226,680 B1 * | 5/2001 | Boucher et al. ........... | 709/230 |
| 6,262,983 B1 * | 7/2001 | Yoshizawa et al. ........ | 370/389 |
| 6,463,067 B1 * | 10/2002 | Hebb et al. ................. | 370/413 |
| 6,535,509 B1 * | 3/2003 | Amicangioli .............. | 370/389 |
| 6,598,034 B1 * | 7/2003 | Kloth ......................... | 706/47 |

OTHER PUBLICATIONS

Che et al., Adaptive Resource Management for Flow-Based IP/ATM Hybrid Switching Systems, IEEE, pp. 544-557, 1998.*
Aweya, IP Router Architectures: An Overview, downloadable at http://citeseer.comp.nus.edu.sg/aweya99ip.html, pp. 1-48, 1999.*
Giordano et al., IP and ATM- a position paper, downloadable at http://sscwww.epfl.ch, pp. 1-45, Jul. 1997.*
Partridge et al, A 50-Gb/s IP Router, IEEE, pp. 237-248, Jun. 1998.*

* cited by examiner

*Primary Examiner*—Frank Duong
(74) *Attorney, Agent, or Firm*—Blakely Sokoloff Taylor & Zafman

(57) ABSTRACT

A network switch receives a data packet, recognizes the data packet as belonging to a given stream, and directs the data packet to a stream processing module in the network switch in response to recognizing the stream to which the packet belongs. The stream processing module further recognizes the source of the stream from which the packet was transmitted, and stores the data packet in a buffer for later transmission, as controlled by the stream processing module, to a destination for the stream. In this way, the stream may be replicated and transmitted by the stream processing module any number of times to multiple destinations in an efficient, cost-effective manner.

23 Claims, 2 Drawing Sheets

METHOD AND APPARATUS PROVIDING FOR DELIVERY OF STREAMING MEDIA

FIELD OF THE INVENTION

The present invention relates to data networks. In particular, the invention relates to the architecture and operation of a network switch optimized for receiving, processing and transmitting audio and/or video streams over a network such as the Internet.

BACKGROUND OF THE INVENTION

Streaming media, such as video, audio, and live events, may be downloaded over a network, for example, the Internet, to a network device. Applications such as video on demand and Internet radio are two common examples of downloading streaming media over the Internet. (A network device is an electronic device such as a desktop computer, personal digital assistant, mobile or laptop computer, cellular or mobile telephone, etc., that is accessible by or over a network).

The streaming media content, e.g., music, typically is input and stored on one or more network devices commonly known as servers ("server"). The streaming media content is then downloaded to many network devices commonly known as clients ("clients"). In some instances, many thousands of clients connect to a given server and request downloading the streaming media content.

Examples of streaming media in a client-server network architecture, in which many clients directly connect to the server to download media, include the Media Pictures Experts Group (MPEG) Layer 3 audio streaming services provided by Nullsoft, Inc., available online at www.shoutcast.com, the audio, video and live events streaming services provided by RealNetworks, Inc., available online at www.realaudio.com, and a live events Webcast service provided by Akamai Technologies, Inc., available online at www.akamai.com. These streaming media services may be implemented using general purpose servers not necessarily optimized for such services.

The streaming media content may be referred to simply as a stream. One method for transmitting a stream over a network to multiple clients involves transmitting a unicast stream from a server to a network switch ("switch"), buffering the unicast stream at the switch, splitting that unicast stream at the switch into multiple unicast streams, and transmitting the multiple unicast streams to multiple clients, typically at the request of those clients.

In general, a switch is a network device that selects a path over which to transmit a unit of data to its next destination. According to the International Standards Organization (ISO) layered Open Systems Interconnection (OSI) communication model, a switch is usually associated with layer 2, the Data-Link Layer. However, switches also perform the routing functions of layer 3, the Network Layer. Layer 3 switches are also sometimes called Internet Protocol (IP) switches. More recently, switches perform routing functions based on layer 4, the Transport Layer, e.g., based on Transmission Control Protocol (TCP) information, which may even involve the switch establishing a Transport Layer connection with the source and/or ultimate destination of a stream.

It should be noted that the term unicast, or unicast communication, generally refers to a communication between a single sending network device (e.g., a server) and a single receiving network device (e.g., a switch or client) over a network. Unicast communication is in contrast to multicast communication between a single sender and multiple receivers. The term point-to-point communication is sometimes used to indicate unicast communication. The term stream, as used by itself hereinafter, refers to a single unicast stream, and the term streams refers to multiple unicast streams, unless specifically stated otherwise.

The stream, generally, and as contemplated herein, is divided into a number of data packets or frames, the number varying widely from a few packets to thousands or more depending on the type and length of content in the stream. The packets may each be fixed length or variable length units of data of a certain number of bytes as may be required by the underlying communications media over, or communications protocols via, which the packets are transmitted. The network addresses of the sending network device and of the destination network device are added to each packet. The stream is unicast so that all packets in the stream are targeted to a single network device. This may be accomplished by using the same destination address in each packet of the stream that matches the unique address of the destination network device. This is in contrast to a stream that is multicast or broadcast, in which all packets in the stream are targeted to many network devices by using a well known destination address in each packet of the stream that is recognized by the many network devices.

What is needed is a network switch, and in particular, a network switch hardware architecture, that optimizes the transmission of a stream from a server to many clients. It is further desired that the network switch hardware architecture be highly scalable so as to be able to simultaneously receive many streams from multiple servers, identify and split, that is, replicate, an individual stream, and transmit the replicated streams to significant numbers of clients in real time, in response to requests from those clients.

SUMMARY

A network switch receives a data packet, recognizes the data packet as belonging to a stream, and directs the data packet to a stream processing module in the network switch in response to recognizing the packet as belonging to a stream. The stream processing module further identifies the source of the stream (i.e., server) to which the data packet belongs; and stores the data packet in an associated buffer for later transmission, as controlled by the stream processing module, to a destination for the stream (i.e., a client). In this way, the stream may be replicated and transmitted by the stream processing module any number of times to multiple destinations in an efficient, cost-effective manner.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION OF THE INVENTION

A method and apparatus providing for the delivery of streaming media (e.g., audio or video data) in a one to many network environment, in which a single stream is transmitted from one or more servers to many clients via a network switch, is described.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

In accordance with the invention, a network switch receives a data packet, recognizes the data packet as belonging to a stream, and directs the data packet to a stream processing module in the network switch in response to recognizing the packet as belonging to the stream. The stream processing module is separate from the switching fabric in the switch, and identifies the source of the stream (i.e., server) to which the data packet belongs. In one embodiment of the invention, the stream processing module is implemented on a separate printed circuit board that can be inserted into a chassis based network switch. The stream processing module further stores the data packet in an associated buffer for later transmission, as controlled by the stream processing module, to a destination for the stream (i.e., a client), typically when a request is received from the destination to transmit the stream to the destination.

Switching fabric, as that term is used herein, refers to the combination of hardware, software, buffers and memory used in a network switch to forward data coming in to the switch out the correct port to the next network device in the network. The switching fabric utilizes integrated circuits and corresponding software that control switching paths through the network switch. It is appreciated that the switching fabric may take many architectural forms, and furthermore is independent of the infrastructure used to transfer data between network devices in the network.

Figure 2:
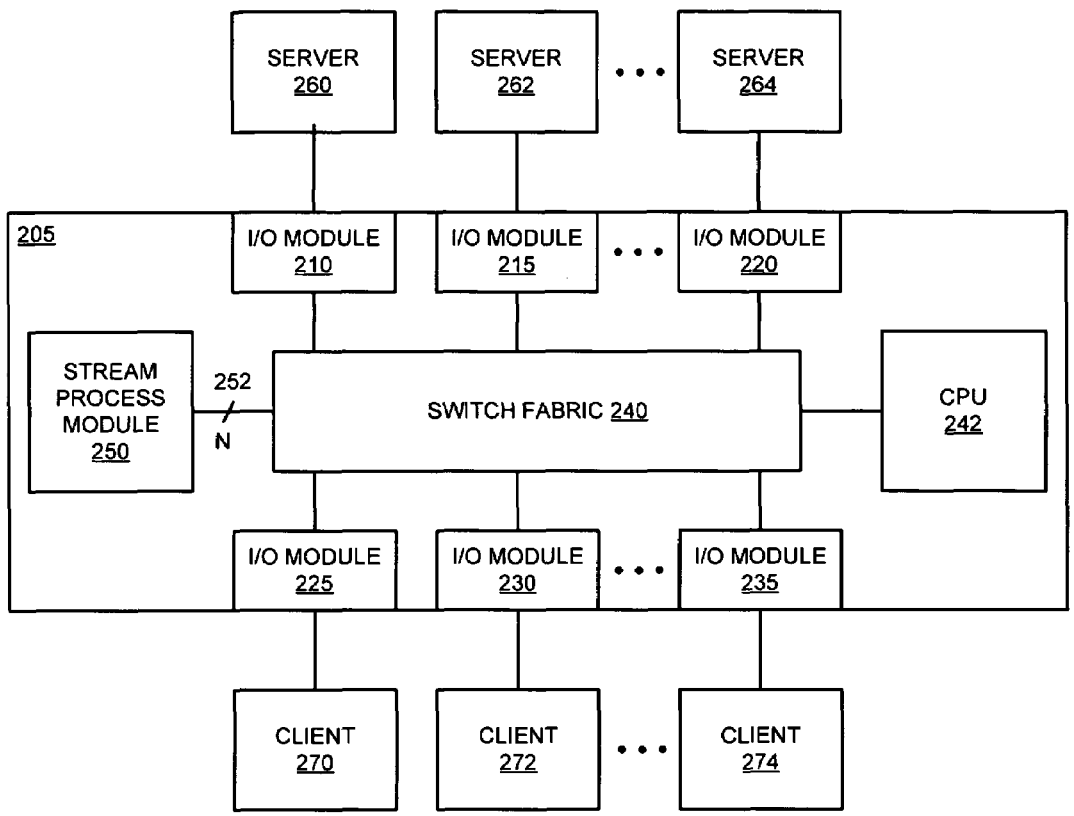
FIG. 2 is a block diagram of the switch hardware architecture according to one embodiment of the invention.

With reference to FIG. 2, a block diagram 200 of the network and network switch hardware architecture contemplated in an embodiment of the invention is provided. The network switch architecture provides a highly scalable, low cost solution to distribute streaming media (a "stream") in a one-to-many network environment.

Multiple servers, such as servers 260–264 provide or source continuous multimedia streams. These servers are coupled in communication, either directly, or via an internetwork, with a network switch 205, such as the BlackDiamond modular chassis switch available from Extreme Networks, Inc., of Santa Clara, Calif., the assignee of this patent application. The streams are provided as input to the network switch, or simply, switch, 205.

Multiple clients, such as clients 270–274 receive continuous multimedia streams from switch 205. These clients are likewise coupled in communication, either directly, or via an internetwork, with switch 205. The streams are output from the switch 205 and received at the clients. While only three clients are depicted in FIG. 2, in a typical environment, the number of clients far surpasses the number of servers, for example, the number of clients is one or more orders of magnitude greater than the number of servers. As a reference point, the number of servers may be 100, while the number of clients may be 20,000, with each client receiving one of one hundred, possibly concurrent, multimedia streams, wherein each multimedia stream is transmitted at a rate of 128 kilobits per second (128 Kbps).

The network switch 205 acts as a proxy for the one or more servers streaming media to the multiple clients. Each server transmits a stream to the switch 205, which the switch then buffers, and retransmits to a client, for example, upon request of the client. The same stream may be retransmitted multiple times from the switch to different clients. This, of course, is one of the main advantages of this proxy architecture versus multiple clients directly maintaining multiple streams with a server, with the concomitant processing overhead on the server to maintain those many multiple streams. Using the switch as a proxy for a server, the server need only maintain a small number of streams to the switch, and the switch, with its architecture optimized to support many multiple streams, may maintain orders of magnitude more streams with the clients.

A communications protocol suite, such as the Transmission Control Protocol/Internet Protocol (TCP/IP) suite of protocols, is used to carry a stream from a server to multiple clients. The TCP/IP suite of protocols, in particular, is used in one embodiment of the invention because the protocol suite guarantees ordered delivery and retransmission of data packets, as necessary.

In one embodiment, the switch maintains separate Transport Layer communications with each client, as well with each server, so that servers and clients communicate directly with the switch, not with each other. For example, a server and the switch may establish a separate TCP session to transmit a stream from the server to the switch, and the switch, in turn, may establish separate TCP sessions, one with each client, to transmit to the clients duplicate copies of the same stream received from the server, in response to requests from the clients to receive the stream.

Again with reference to FIG. 2, multiple Input/Output modules 210–235 are provided in switch 205. These I/O modules provide a means by which data packets are received by the switch, and transmitted by the switch to the next network device in the network. It is appreciated that the I/O modules support connections to many different types of networks, such as Ethernet, Fast Ethernet and Gigabit Ethernet networks. The term Ethernet, as used herein is meant to apply to Local Area Networks (LANs) adhering to the Carrier Sense, Multiple Access with Collision Detection (CSMA/CD) standard, generally operating at a signaling rate of 10 Mb/s over various media types and transmitting Ethernet formatted or Institute of Electrical and Electronic Engineers (IEEE) standard 802.3 formatted data packets. Fast Ethernet and Gigabit Ethernet adhere to the same CSMA/CD standard, and generally operate at a signaling rate of 100 Mb/s and 1000 Mb/s, respectively, over various media types and also transmit Ethernet formatted or IEEE 802.3 formatted data packets. The I/O modules may provide support for connection to other types of networks, of course, without departing from the invention. Moreover, while the architecture depicted in FIG. 2 illustrates the each of the clients directly connected to a respective I/O module, it is understood that the clients may be connected to the I/O modules through an internetwork comprising any number and types of network devices and paths, so long as the clients are each able to maintain a session with the network switch 205, for example, to download a stream.

A switch fabric 240 interconnects I/O modules within the switch 205. Switch fabric 240 receives data packets from I/O modules, and forwards the data packets to the correct I/O module for output to the next network device in the network via which the destination of the data packets is reachable. The next network device in the network may be a directly connected client, or, for example, another switch via which the destination, i.e., client, is reachable. The switch fabric, in one embodiment, is capable of Layer 3 (Network Layer) switching, e.g., switching data packets based on destination IP address information in the data packets, and Layer 2 (Link Layer) switching, e.g., switching data packets based on destination Media Access Control (MAC) address information in the data packets. A controller, such as central processing unit 242, controls the operation of switch fabric 240. It should be noted that further references to switch fabric 240 and the operation thereof contemplate the necessary hardware and logic, as well as software that controls such hardware or logic, for proper operation of the switch fabric 240. Such detail will not be provided herein since the making and operation of switch fabric 240 is well understood in the related arts.

In one embodiment of the invention, the switch fabric 240 redirects received multimedia streams to stream processing module 250. Redirection of a stream occurs on a per data packet basis, that is, as each data packet belonging to a stream is received by the switch, the packet is redirected to the stream processing module 250. The switch fabric 240 in the switch identifies a data packet as belonging to a stream by parsing protocol header information in each received data packet, and based on such information, either switches the data packet to an I/O module, where the data packet is to be output by the switch, or redirects the data packet to the stream processing module 250 for further processing if the data packet belongs to a stream.

Stream processing module 250, upon receiving a data packet from the switch fabric, identifies whether the data packet was received from a source of the stream to which the data packet belongs (e.g., a server), and if so, buffers the data packet in a buffer controlled by the stream processing module.

A destination of the stream requests to receive a stream by sending a data packet, the content of which includes a request for the stream. The data packet including the request for the stream is received by switch 205, identified by the switch fabric 240 as belonging to or being associated with the stream, and redirected to stream processing module 250. Stream processing module 250 receives the data packet, identifies the data packet as being received from a destination of the stream (e.g., a client) and including a request to receive the stream, reads a data packet received from the source of the stream from the buffer and transmits the same to the I/O module of switch 250 out which the destination of the stream is reachable.

Figure 1:
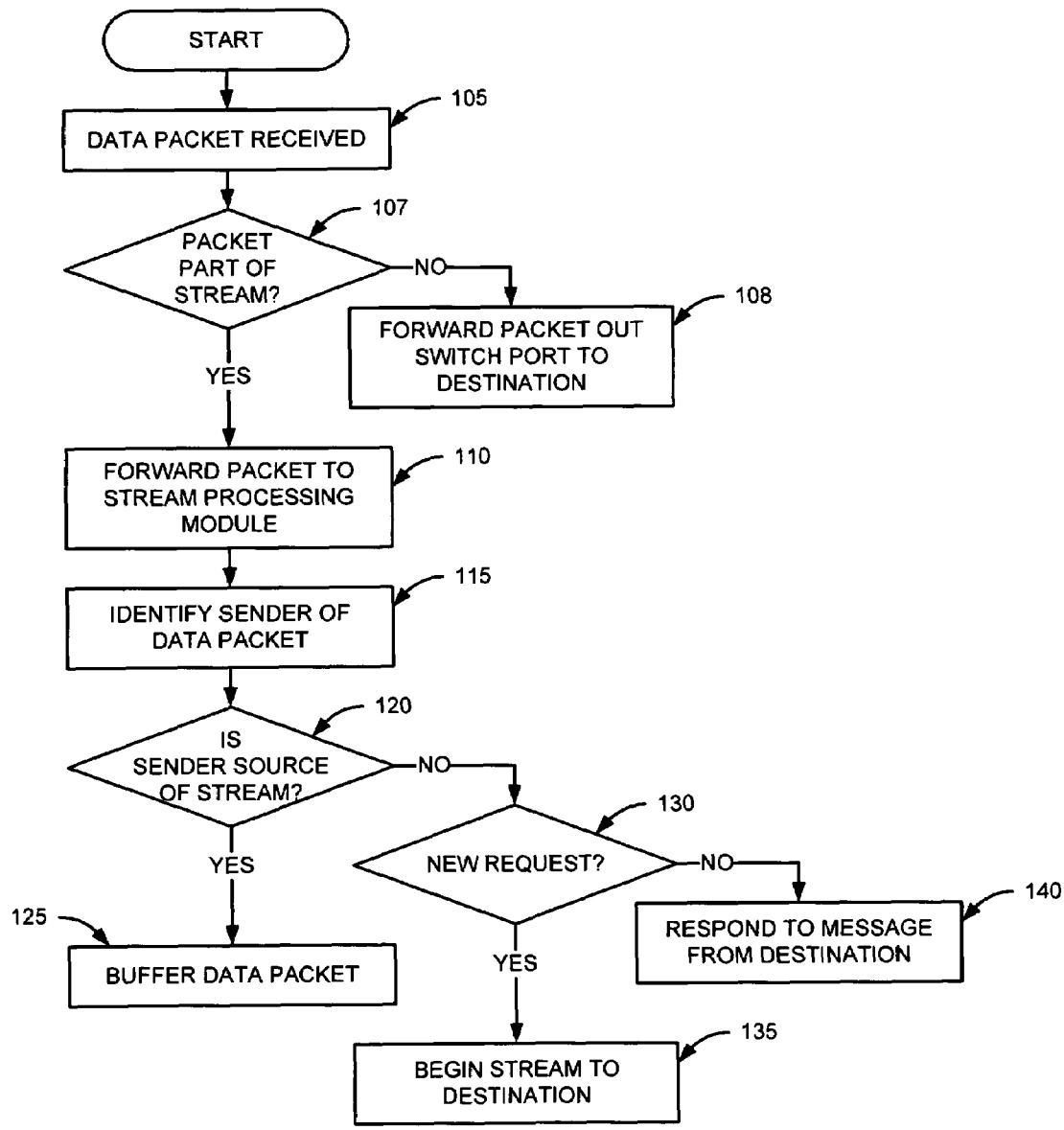
FIG. 1 is a flow chart illustrating an embodiment of the process contemplated by the invention.

The process for delivering a stream, according to an embodiment of the invention, is now more fully described with respect to FIG. 1. At 105, a data packet is received at a port of an I/O module, e.g., I/O module 210. In this example, it is assumed the data packet belongs to a stream, and in particular, the data packet is sent from a source of a stream, e.g., server 260, to the network switch 205. The data packet therefore includes a destination address that matches an address assigned to the network switch, in particular, the stream processing module. (It should be noted that multiple addresses may be assigned to the stream processing module.) Upon receiving the data packet, the I/O module 210 of switch 205 forwards the data packet to switch fabric 240 for further processing. At 107, the switch fabric determines whether the data packet is part of a multimedia stream, and if so, forwards the data packet to the stream processing module, otherwise, at 108, the switch fabric forwards the data packet as usual in accordance with the traditional operation of a switch fabric.

At 107, the switch fabric 240 searches a memory in the switch fabric for an address matching the destination address in the data packet. For example, the switch fabric looks up the destination address in a table of addresses. (The destination address may be a layer 2 destination MAC address in one embodiment of the invention.) If the destination address matches an address associated with the stream processing module, then the data packet is redirected to the stream processing module at 110. (It should be noted that the destination MAC address in the data packet can match a MAC address assigned to the stream processing module—in such case, a proxy address resolution protocol (ARP) function supplies the MAC address for the stream processing module when an ARP request is received for an IP address assigned to the stream processing module).

In another embodiment of the invention, the address lookup may indicate that the destination MAC address in the received data packet is associated with the routing function of the network switch, at which point, the switch fabric 240 looks up in a table in memory a network layer address matching the network layer destination address in the data packet, e.g., the destination IP address. The lookup routine may then indicate that the packet should be forwarded to the stream processing module.

It is appreciated that switch fabric 240 may parse information other than or in addition to the destination MAC or destination IP address in the protocol header portion of the data packet, at 107, and forward, at 110, the data packet to stream processing module 250 on that basis. For example, the switch fabric may look up a destination Transport Layer protocol port number, such as a Transmission Control Protocol (TCP) port number, and if found, the data packet is forwarded to the stream processing module. Of course, there may be multiple streams, each identified by a unique Transport Layer protocol port number. Thus, any data packets having a Transport Layer protocol port number associated with a stream are forwarded to the stream processing module.

On receiving the data packet, at 115, the stream processing module identifies the sender of the data packet as either a server or a client. In one embodiment of the invention, the sender of the data packet is identified by parsing protocol header information in the data packet. For example, a sender may utilize a particular Network Layer address, such as a destination IP address, in the protocol header of data packets it transmits to the stream processing module to identify itself as either the source or destination of the stream. In another embodiment, the sender may utilize a number or range of Network Layer addresses for data packets to be transmitted to the stream processing module.

Thus, a server or source of a stream may utilize a particular IP address or number or range of IP addresses in the destination IP address field of the IP header portion of the data packet to identify itself as the source of the stream. Likewise, a client, or destination of a stream, may utilize a destination Network Layer address, or number or range of destination Network Layer addresses, different from the destination Network Layer address or range of destination Network Layer addresses used by a server, to identify the destination as the sender of a data packet to the stream processing module.

In one embodiment, Transport Layer protocol information (such as a destination UDP or TCP port number) or other higher layer protocol information in the header portion of the data packet may additionally or alternately be used to identify the sender of the data packet as either the source of the stream or the destination of the stream.

The stream processing module may discern between a data packet received from a source of the stream (e.g., server) versus a data packet received from a destination of the stream (e.g., a client) a number of ways. For example, the stream processing module may make such a determination on the basis of a preconfigured table of values, or a simple algorithm. One such way to determine whether a data packet was sent from a source versus a destination is to configure the stream processing module with a particular destination IP address or number or range of destination IP addresses to be utilized only by a source in communicating with the stream processing module. The stream processing module further is configured with a different destination IP address or number or range of destination IP addresses to which only a destination connects when communicating with the stream processing module. (It is contemplated that the sources and destinations of streams are appropriately equipped to synchronize with the destination IP address(es) configured at the stream processing module to be utilized in communicating with the stream processing module, and therefore use the IP address(es) configured for such at the stream processing module when communicating with the module). In this example, it is assumed the source sent the data packet, e.g., server 260, using a unique destination IP address that is reserved for a source of a stream in communicating with the stream processing module.

At this stage in the example, the stream processing module has discerned that the sender of the data packet is a source of a stream by looking at the destination IP address in the protocol header portion of the data packet and recognizing the address as one utilized only by a source in communicating with the stream processing module. The next step is to identify the particular stream from the source, or "source stream" to which the data packet belongs, since multiple streams may be transmitted by the same or a different source utilizing the same destination IP address.

In one embodiment of the invention, when a data packet containing a connection request is received by the stream processing module from a source of a stream, an entry in a data structure is established in which a stream identifier is associated with information obtained from the protocol header portion of the data packet that uniquely identifies the particular stream to which the data packet belongs. For example, when a connection is established using the well known TCP three way handshake, the source and destination IP address, IP protocol number, and source and destination TCP port numbers (collectively known as a "5-tuple") which uniquely identify the connection, are extracted from the protocol header portion of the data packet and stored in an entry in a data structure. The entry in the data structure further contains a stream identifier associated with the 5-tuple. Thereafter, when a data packet is received from a source of a stream, the 5-tuple from the packet is compared with the entries in the data structure to find the particular stream identifier associated with the 5-tuple from the packet. In this manner, the source stream to which the data packet belongs is identified.

A different buffer is allocated per stream, and each buffer is associated with a particular stream by the stream identifier for the stream. Each stream, of course, has its own associated buffer, so that data packets for one stream are stored in one buffer, and data packets for other streams are stored in other, respective, buffers. These buffers may be referred to as stream buffers, or simply, buffers.

In one embodiment, a stream buffer is circular, and a pointer indicates the location in the buffer at which to store a new data packet received by the stream processing module from a source for a given stream. For reference, this buffer pointer is referred to herein as the source buffer pointer.

If a determination is made at 120 that the sender of the data packet is not a source of a stream, but rather the destination of the stream with which the data packet is associated, as determined by the destination IP address in the protocol header portion of the data packet, the stream processing module examines at 130 whether the data packet includes a request by the destination to receive a stream. The request, for example, may be communicated during initialization of the session between the stream processing module and the destination.

The request for the stream includes a stream identifier that has been associated with the stream by the source (server) of the stream. If the data packet includes a request by a destination of the stream to receive the stream, a new stream identified by the stream identifier is established with the destination. In establishing the stream with the destination, the 5-tuple from the data packet requesting the stream is extracted from the protocol header portion of the data packet and stored in an entry in a data structure accessible by the stream processing module. The entry in the data structure further contains the stream identifier included in the request transmitted by the destination, thereby associating the stream identifier with the 5-tuple. In this manner, a particular session between the stream processing module and the destination is associated with a particular stream. Thereafter, when a data packet is received from the destination of the stream, the 5-tuple from the packet is compared with the entries in the data structure to find the particular stream identifier associated with the 5-tuple from the packet, and thus the particular stream of information being downloaded to the destination. In this manner, the stream processing module downloads data packets maintained in the stream buffer allocated for the stream to the destination.

It is contemplated that multiple destinations can establish a connection with the stream processing module using the same destination IP address, but that destination IP address can only be one of those IP addresses configured at the stream processing module via which a destination is allowed to establish a stream with the stream processing module. Additionally, multiple destinations can establish a session with the stream processing module using the same destination IP address and request reception of different streams by including a different stream identifier in the data packets containing the stream request.

From a user's perspective, the invention operates as follows. A user types in, or otherwise provides input, at the client, such as the name of a song, or a video, or clicks on a file that contains, or an icon that represents, the song or video. The user's request is translated into a request for a particular stream that is buffered by the network switch's stream processing module. In particular, the user's request is translated into a Stream Identifier (SID) that is included in the request. A server informs the stream processing module of the SID associated with a stream when the stream is initiated.

A buffer pointer is provided for each TCP session established between the stream processing module and a client. For reference, this buffer pointer is referred to as the destination buffer pointer. The destination buffer pointer may initially point to the same location in the buffer at which data packets being received from the source of the stream are stored. That is, the destination buffer pointer and the source buffer pointer point to the same location in the circular buffer. Alternatively, the destination buffer pointer points to a location back in the circular buffer from the location pointed to by the source buffer pointer, that is, the location at which data packets received from the source of the stream are being stored. This location may be, in part, based on the buffer size allocated at the destination. Data packets are then transmitted from the buffer to the destination at a rate so that the destination buffer pointer catches up with the source buffer pointer, and the destination is then receiving the stream in real time.

Multiple streams may be established between the stream processing module and one or more clients, all accessing the same stream received from a server. A different destination buffer pointer is provided for each of the multiple streams, so that the clients can receive data packets in the stream at a rate independent of other clients. If a client falls behind, that is, the source buffer pointer for the source of the stream catches up with the destination buffer pointer for a client of the stream (given a circular, first in, first out, buffer), the client begins receiving the new content, that is, the client begins receiving the most recently received data packets that are being stored in the buffer, overlaying the oldest data packets in the buffer. In one embodiment of the invention, the initial prebuffering procedure described above is repeated in this situation (i.e., backing up the pointer from the tip and bursting a buffer's worth of data).

In one embodiment of the invention, when the stream processing module initially begins to download data packets to a destination for which a new stream was just established, a burst of data packets are sent to the client as quickly as possible, and those packets typically are buffered in memory accessible by the destination. (Either the destination or the stream processing module may request or configure the amount of data to transmit in the initial burst, and the buffering requirements to support such a burst). By sending the initial burst of data packets, the application being executed by the client has a number of data packets to begin processing and is not left waiting to receive further data packets in the stream, for example, when network congestion causes the transmission rate of data packets between the switch and client to fall. This initial burst and buffering of data packets prevents any minor subsequent delay in a destination receiving data packets belonging to the stream from causing real time delivery of the stream to be interrupted. For example, if the stream is a song, a user at the client may otherwise be frustrated by a delay or interruption in receiving and playing back the song.

If, at 130, the data packet is sent by a destination of a stream and does not include a request to start a new stream, then the data packet typically includes a control or management request of some kind regarding an existing stream. For example, the data packet may include a request to terminate an existing stream, or an acknowledgement of receipt of one or more data packets in the stream, and the stream processing module responds accordingly. For example, if the data packet includes a request to terminate an existing stream, the stream processing module tears down the connection with the client and no longer sends data packets from the stream buffer to the client.

What is claimed is:

1. In a network switch having a switching fabric that forwards data packets, a method comprising:
   receiving a data packet at an input port of the network switch;
   recognizing the data packet as belonging to a stream;
   directing the data packet to a stream processing module separate from the switching fabric in response to identifying the packet as belonging to a stream;
   identifying at the stream processing module the data packet as being received from a source of the stream; and
   storing in a stream buffer, in response to identifying the data packet as being received from a source of the stream, the data packet to replicate the stream for transmission to a destination for the stream via an output port of the network switch.

2. The method of claim 1, wherein the data packet is a first data packet and the stream is a first stream, and further comprising:
   receiving a second data packet at an input port of the network switch;
   identifying the second packet as belonging to a stream;
   directing the second data packet to the stream processing module;
   identifying at the stream processing module the second data packet as being received from a destination for the first stream, the second data packet comprising a request from the destination for the first stream to receive the first stream; and
   transmitting the first data packet from the buffer to the destination for the first stream in response to the request from the destination for the first stream.

3. The method of claim 1, further comprising:
   transmitting the data packet from the buffer to the destination for the stream.

4. The method of claim 1, wherein identifying the data packet as belonging to a stream comprises inspecting a destination address in the data packet and matching the destination address to an address associated with the stream processing module in the network switch.

5. The method of claim 4, wherein the destination address is a destination hardware address and the address associated with the stream processing module is a hardware address.

6. The method of claim 5, wherein the destination hardware address is an IEEE 802.3 Collision Sense Multiple Access with Collision Detection (CSMA/CD) Media Access Control (MAC) address and the hardware address associated with the stream processing module is an IEEE 802.3 CSMA/CD MAC address.

7. The method of claim 5, wherein inspecting a destination address in the data packet and matching the destination address to an address associated with the stream processing module comprises inspecting a destination Media Access Control (MAC) address in the data packet and matching the destination MAC address to a MAC address associated with the stream processing module.

8. The method of claim 6, wherein the destination MAC address in the data packet is a unicast destination MAC address.

9. The method of claim 1, wherein identifying the data packet as belonging to a stream comprises inspecting a destination address in the data packet and matching the destination address with an address associated with the stream.

10. The method of claim 9, wherein the destination address in the data packet and the address associated with the stream each comprises a network layer protocol address.

11. The method of claim 10, wherein the destination network layer protocol address in the data packet and the network layer protocol address associated with the stream each comprises a Internet Protocol (IP) address.

12. The method of claim 1, wherein identifying the data packet as belonging to a stream comprises inspecting a destination network layer protocol address in the data packet and matching the destination network layer protocol address with a network layer protocol address associated with the stream.

13. The method of claim 12, wherein the destination network layer protocol address in the data packet and the network layer protocol address associated with the stream each comprise an Internet Protocol (IP) address.

14. The method of claim 1, wherein identifying at the stream processing module the data packet as being transmitted from a source of the stream comprises inspecting at the stream processing module a destination network layer protocol address in the data packet and matching at least some portion of the destination network layer protocol address with a network layer protocol address maintained in the stream processing module for communicating with the source of the stream.

15. The method of claim 14, wherein the destination network layer protocol address in the data packet comprises a destination Internet Protocol (IP) address in the data packet.

16. The method of claim 1, wherein buffering the data packet for transmission from the stream processing module comprises buffering the data packet in a last in first out buffer.

17. In a network switch having a switching fabric that forwards data packets, a method comprising:
  receiving a data packet at an input port of the network switch;
  identifying the data packet as being received from a source of a stream;
  directing the data packet to a stream processing module in the network switch separate from the switching fabric in response to identifying the data packet as being received from the source of the stream;
  buffering the data packet for transmission from the stream processing module in response to identifying the data packet as being received from the source of the stream, to store the data packet for replication of the stream.

18. The method of claim 17, wherein identifying the data packet as being received from a source of a stream comprises inspecting at least one of a destination address, destination network layer protocol address, and destination transport layer protocol port number in the data packet and matching the same with an address assigned to the stream processing module.

19. The method of claim 18, wherein inspecting at least one of a destination address, destination network layer protocol address, and destination transport layer protocol port number in the data packet and matching the same with an address assigned to the stream processing module comprises inspecting at least one of a destination hardware address, destination Internet Protocol (IP) address, and destination Transmission Control Protocol (TCP) port number in the data packet and matching the same with an address assigned to the stream processing module.

20. In a network switch having a switching fabric that forwards data packets, a method comprising:
  receiving a data packet at an input port of the network switch;
  identifying the data packet as belonging to a stream;
  directing the data packet to the stream processing module in response to identifying the data packet as belonging to a stream;
  identifying at the stream processing module the data packet as being transmitted from a destination for the stream, the data packet comprising a request from the destination for the stream to receive the stream; and
  reading from a buffer accessible to the stream processing module a second data packet stored therein, the second data packet received from a source for the stream, and transmitting the second data packet to the destination for the stream, in response to the request from the destination for the stream to receive the stream.

21. In a network switch having a switching fabric that forwards data packets, a method comprising:
  receiving a data packet;
  recognizing the data packet as belonging to any one of a plurality of streams;
  directing the data packet to a stream processing module in response to identifying the packet as belonging to any one of the streams;
  identifying at the stream processing module the data packet as being received from a source of any one of the streams;
  identifying at the stream processing module the data packet as belonging to a particular one of the streams received from the source;
  storing in a buffer the data packet to replicate the stream for transmission to a destination for the stream, the storing in response to identifying the data packet as belonging to a particular stream.

22. The method of claim 21, wherein identifying at the stream processing module the data packet as being received from a source of any one of the streams comprises inspecting a destination address in the data packet and matching the destination address to an address associated with the stream processing module in the network switch.

23. The method of claim 22, wherein identifying at the stream processing module the data packet as belonging to a particular one of the streams received from the source comprises matching unique identifying information in a protocol header portion of the data packet with an entry in a data structure accessible to the stream processing module, the entry associating the data packet with a stream identifier for the stream.

* * * * *